(12) United States Patent
Olsen, III et al.

(10) Patent No.: US 7,484,663 B2
(45) Date of Patent: *Feb. 3, 2009

(54) METHODS AND SYSTEMS FOR AUTOMATING INVENTORY AND DISPATCH PROCEDURES AT A STAGING AREA

(75) Inventors: John A. Olsen, III, Cumming, GA (US); David L. Bradley, Alpharetta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/840,797

(22) Filed: Aug. 17, 2007

(65) Prior Publication Data

US 2007/0288294 A1 Dec. 13, 2007

Related U.S. Application Data

(62) Division of application No. 10/891,416, filed on Jul. 14, 2004, now Pat. No. 7,273,172.

(51) Int. Cl.
| | |
|---|---|
| *G06F 19/00* | (2006.01) |
| *G06Q 30/00* | (2006.01) |
| *G06Q 90/00* | (2006.01) |
| *G01C 21/00* | (2006.01) |
| *H04B 14/00* | (2006.01) |
| *G08B 1/08* | (2006.01) |
| *G08G 1/123* | (2006.01) |

(52) U.S. Cl. ............... 235/385; 235/375; 340/539.13; 340/994; 340/989; 701/200; 701/207; 701/213

(58) Field of Classification Search .............. 235/385, 235/375, 384; 340/539.13, 988; 701/209; 705/1, 9
See application file for complete search history.

(56) References Cited

U.S. PATENT DOCUMENTS

| | | | | |
|---|---|---|---|---|
| 4,831,539 | A | * 5/1989 | Hagenbuch | ............... 701/207 |
| 5,347,274 | A | * 9/1994 | Hassett | ............... 340/988 |
| 5,848,373 | A | * 12/1998 | DeLorme et al. | ............ 701/200 |

(Continued)

OTHER PUBLICATIONS

European Search Report, Application Serial No. EP 08 00 6146.8-1238; Mailing date Aug. 18, 2008.

(Continued)

*Primary Examiner*—Thien M. Le
*Assistant Examiner*—Thien T Mai
(74) *Attorney, Agent, or Firm*—Alston & Bird LLP

(57) ABSTRACT

Methods and systems for automating inventory and dispatch procedures at a staging area by automatically detecting the arrival or departure of delivery vehicles, container devices and other such items. Detection of these items is facilitated by the use of automatic identification tags, and other such devices, that are physically associated with each such item. The detection of inbound vehicles and related container devices triggers a series of automated communications that facilitate the dispatch of such items within the staging area. When a delivery vehicle or container device departs, the system can be configured to check the tag or device associated with each such item so as to confirm that the correct container device(s) are associated with the correct outbound delivery vehicle. The system further provides a method of tracking inventories of such items in real time.

26 Claims, 7 Drawing Sheets

U.S. PATENT DOCUMENTS

| | | | |
|---|---|---|---|
| 5,869,819 A * | 2/1999 | Knowles et al. | 235/375 |
| 6,148,291 A * | 11/2000 | Radican | 705/28 |
| 6,349,211 B2 * | 2/2002 | Koshima et al. | 455/457 |
| 6,356,802 B1 * | 3/2002 | Takehara et al. | 235/385 |
| 6,389,334 B1 * | 5/2002 | Castor | 701/3 |
| 6,405,132 B1 * | 6/2002 | Breed et al. | 701/301 |
| 6,659,344 B2 * | 12/2003 | Otto et al. | 235/385 |
| 6,665,585 B2 * | 12/2003 | Kawase | 700/226 |
| 6,721,652 B1 | 4/2004 | Sanqunetti | |
| 6,995,667 B2 * | 2/2006 | He et al. | 340/539.13 |
| 7,034,683 B2 * | 4/2006 | Ghazarian | 340/568.1 |
| 7,069,239 B2 * | 6/2006 | Fawcett et al. | 705/28 |
| 7,164,986 B2 * | 1/2007 | Humphries et al. | 701/207 |
| 7,273,172 B2 * | 9/2007 | Olsen et al. | 235/385 |
| 7,379,805 B2 * | 5/2008 | Olsen et al. | 701/50 |
| 2002/0161675 A1 * | 10/2002 | Kawase | 705/29 |
| 2003/0060938 A1 | 3/2003 | Duvall | |
| 2003/0120522 A1 | 6/2003 | Uyeki | |
| 2003/0195699 A1 | 10/2003 | Kelly | |
| 2003/0204407 A1 * | 10/2003 | Nabors et al. | 705/1 |
| 2004/0077347 A1 | 4/2004 | Lauber | |
| 2005/0083213 A1 * | 4/2005 | Stevens et al. | 340/994 |
| 2006/0238340 A1 | 10/2006 | Harvey | |

OTHER PUBLICATIONS

Supplementary European Search Report, Application Serial No. EP 05 72 5789.1; Mailing date Aug. 18, 2008.

* cited by examiner

METHODS AND SYSTEMS FOR AUTOMATING INVENTORY AND DISPATCH PROCEDURES AT A STAGING AREA

CROSS-REFERENCE TO RELATED APPLICATIONS

This application is a divisional of U.S. application Ser. No. 10/891,416, filed Jul. 14, 2004, which is hereby incorporated herein in its entirety by reference.

FIELD OF THE INVENTION

The present invention relates generally to coordinating activities associated with the movement of items into and out of a staging area, and more particularly, to systems and associated methods for automating inventory and dispatch procedures related to delivery vehicles, container devices and other such items that are moving through such locations.

BACKGROUND OF THE INVENTION

Within a transportation network, staging areas play a critical role in attempting to ensure that goods are transported throughout the transportation network in an efficient and reliable manner. The term "staging area," as used herein, refers to any processing or exchange point within a transportation network, including, but not limited to, a delivery hub, a vehicle exchange point, a rail yard, an air terminal, a shipping port, or any other such point through which delivery vehicles, cargo containers and other related items pass. An important aspect of ensuring that a staging area itself operates in an efficient and reliable manner is the need to have systems and methods in place for coordinating the flow of vehicles that haul goods to and from the staging area on a daily basis.

Goods are typically moved throughout a transportation system within various types of container devices, which are transported under the control of a powered unit. A "powered unit," as used herein, generally refers to any vehicle capable of providing the means to move items or containers from one location to another within a transportation system, such as a tractor, a locomotive, a tug, a van, a ship, or any other such vehicle. A "container device," as used herein, generally refers to any container-like structure that can be used to hold goods for transport, such as a trailer that is typically pulled by a corresponding tractor along roadways, a shipping or cargo container of a type commonly seen on ships and trains, an air cargo container (sometimes referred to as an "igloo"), or any other such device that can be used to hold goods as they are transported under the control of an associated powered unit.

For example, when a delivery truck arrives at a hub location, the driver of the vehicle preferably needs to be aware of certain information, such as where to drop off the inbound load which he or she is transporting. Typically, the delivery driver also needs to be informed as to whether or not he or she will subsequently be transporting a new, outbound load. If the driver is assigned a new, outbound load, he or she must sometimes be given information on how to identify and locate the particular load within the delivery hub, and on where to go with the load after leaving the hub. In the case of a rail yard, the delivery vehicle may be a train that includes a plurality of freight cars in which each freight car contains one or more shipping containers. When the train arrives at the rail yard, some or all of the containers may need to be removed from the train and placed at particular locations within the yard. Meanwhile, other containers already residing in the rail yard may need to be loaded onto the train so that they can be shipped to a new location. Yet another example can include an air terminal where various types of powered units are used to pull trains of "igloos" (air containers) into and out of a staging area so that such containers can be loaded to and from airplanes.

To ensure that these and other such events occur in an organized and systematic fashion, shipping companies such as UPS® have developed various methods for managing the flow of vehicles and containers at staging areas within a transportation network. For example, one prior art method of coordinating events at a delivery hub involves having a call box or telephone positioned at one or more of the gates associated with the delivery hub. When a delivery truck arrives at the hub, the driver of that truck is expected to use the call box to manually call a dispatch center for instructions on how to proceed. The dispatch center is responsible for providing the driver, via the call box, with the type of information mentioned above, such as where to drop off an inbound load, where or how to locate the driver's next outbound load, and where to go with an outbound load after leaving the hub. One problem with this method is that the process frequently takes as long as fifteen to twenty minutes for each delivery vehicle. In many cases the waiting time for each vehicle can be effectively doubled because a similar process is required for all outbound vehicles.

Another problem which presently occurs at some staging areas is that drivers frequently pull out and leave with the wrong outbound loads. In the current operating environment, unique vehicle identification numbers are typically associated with each delivery vehicle and with each trailer (or container placed on/in a trailer, rail car, airplane, etc.) operating within a transportation network. According to one prior art method, each vehicle identification number is displayed in a human-readable format on a label affixed to an outer surface of each such vehicle (or container). By receiving a vehicle identification number from the dispatch center at the staging area, a delivery driver is able to identify the particular outbound trailer (or other vehicle or container) that the driver is assigned to leave with. When the driver locates a trailer that appears to contain the correct vehicle identification number, the driver pulls the trailer and exits the staging area.

Unfortunately, the manual nature of this process allows for a significant number of transpositional errors, meaning that at some point in the process the proper sequence of numbers and/or letters that make up a vehicle identification number can be misconstrued. Transpositional errors may occur either at the time the driver receives the sequence of numbers (and/or letters) from the dispatch center, or when the driver compares the identification number received from the dispatch center to the sequence of numbers he or she perceives to be on a given vehicle. In either case, if the driver is mistakenly off by one or more numbers (or letters), he or she will most likely end up pulling the wrong load. The real detriment to having a driver pull the wrong load is that the mistake is typically not discovered until the driver reaches the next staging area or other exchange point, which can be hundreds of miles away.

Yet another issue associated with coordinating the flow of vehicles at a staging area is the need to keep track of what and where shipping assets are at a given location. To maintain an inventory of what vehicles and other assets are at each staging area within a transportation network, delivery personnel at some locations are required to go out into the yard at certain times of the day and physically write down the vehicle identification numbers of each vehicle, container or other item on the property. Not only is this a costly way of taking inventory, but more importantly, it only provides an accurate reading of what vehicles or containers are at a particular location as of the last manual reading.

Therefore, a need exists for an improved system and method of coordinating the activities associated with the flow of vehicles, containers and other such items at a staging area that allows for expedited dispatch procedures, that provides a way of detecting when a driver leaves the area with the wrong load, and that provides a means for maintaining an accurate, real-time inventory of vehicles, containers and other such items.

BRIEF SUMMARY OF THE INVENTION

The present invention is directed to systems and methods for coordinating the activities associated with the flow of vehicles, containers and other such items at a staging area. Among other things, the present invention allows for expedited dispatch procedures, provides a way of detecting when a driver leaves an area with the wrong load, and provides a means for maintaining an accurate, real-time inventory of vehicles, containers and other such items.

In one embodiment of the present invention, a system for automating procedures related to delivery vehicles at a staging area is described that includes a reader system which is configured to capture a first identifier associated with a powered unit, and capture a second identifier that is associated with a container device, which is being transported under the control of the powered unit. The system further includes an information management system that is configured to receive the first and second identifiers from the reader system, and query a database using at least one of the identifiers to obtain data related to the powered unit and the container device. In one embodiment, the first and second identifiers can be stored on first and second radio-frequency identification (RFID) tags that are respectively associated with the powered unit and the container device. Other embodiments can include other types of wireless devices, such as Bluetooth devices, for example.

In another embodiment of the present invention, a method of automating container device exchange procedures at a staging area is described that includes the steps of capturing a first identifier associated with a powered unit; capturing a second identifier associated with a container device, which is being transported under the control of the powered unit; and querying a database using the first and second identifiers to obtain data related to the powered unit and the container device. The capturing of the first and second identifiers can occur during a time when the powered unit and the container device are inbound to the staging area, and an information management system can be configured to wirelessly transmit various types of dispatch data to a computer device used by a driver of the powered unit. The dispatch data can include such things as an indication of where the container device is to be separated from the powered unit and left. The capturing of the first and second identifiers can also occur during a time when the powered unit and the container device are outbound from the staging area and the data queried from the database can be used to check such things as whether the powered unit and the container device form a proper powered unit-container device pairing that is authorized to leave the staging area.

In another embodiment of the present invention, a method is described for automating inbound and outbound powered unit/container device exchange procedures at a staging area having at least one wireless access point, in which drivers, having driver's terminals, drive powered units pulling detachable container devices in and out of the staging area, the container devices having at least one wirelessly operated device for identifying the container device. The method includes the steps of establishing an outer geofence and an inner geofence, the geofences readable by a driver's terminal; upon the crossing of the outer geofence by the driver's terminal, sending a first signal from the driver's terminal to the staging area wireless access point; pursuant to the reciept of the first signal, creating a driver's dispatch including instructions for the driver upon arrival at the staging area; upon the crossing of the inner geofence by the driver's terminal, sending a second signal from the driver's terminal to the staging area wireless access point, the second signal comprising a first MAC address identifying the driver's terminal and a second MAC address identifying the wireless device associated with the container device; and pursuant to the receipt of the second signal, sending the driver's dispatch to the driver's terminal.

In another embodiment of the present invention, a method is described for automating inbound and outbound procedures for delivery vehicles at a staging area that includes capturing a first identifier stored on a first identification device that is physically associated with a powered unit, the powered unit being inbound to the staging area; capturing a second identifier stored on a second identification device that is physically associated with an inbound container device, the inbound container device being pulled by the powered unit; sending the first and second identifiers to an information management system; sending first location data from the information management system to a computer device located within the powered unit, the first location data identifying a drop-off location within the staging area at which the inbound container device is to be separated from the powered unit and left; sending second location data from the information management system to the computer device, the second location data identifying a pickup location within the staging area from which an outbound container device can be retrieved and connected to the powered unit; capturing the first identifier stored on the first identification device that is physically associated with the powered unit, the powered unit now being outbound from the staging area; capturing a third identifier stored on a third identification device that is physically associated with the outbound container device, the outbound container device being pulled by the powered unit; sending the first and third identifiers to the information management system; and generating an alert if it is determined that the powered unit and the outbound container device form an incorrect match.

In another embodiment of the present invention, systems and methods are described for maintaining an inventory of vehicles and container devices at a shipping location. These systems and methods involve physically associating a unique identifier with each vehicle or container device of a type to be included in the inventory; capturing the unique identifier associated with each such vehicle or container device that enters the location; recording the unique identifier associated with each such vehicle or container device that enters the location in an inventory database; capturing the unique identifier associated with each such vehicle or container device that exits the location; and deleting the unique identifier associated with each such vehicle or container device that exits the location from the inventory database.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1:
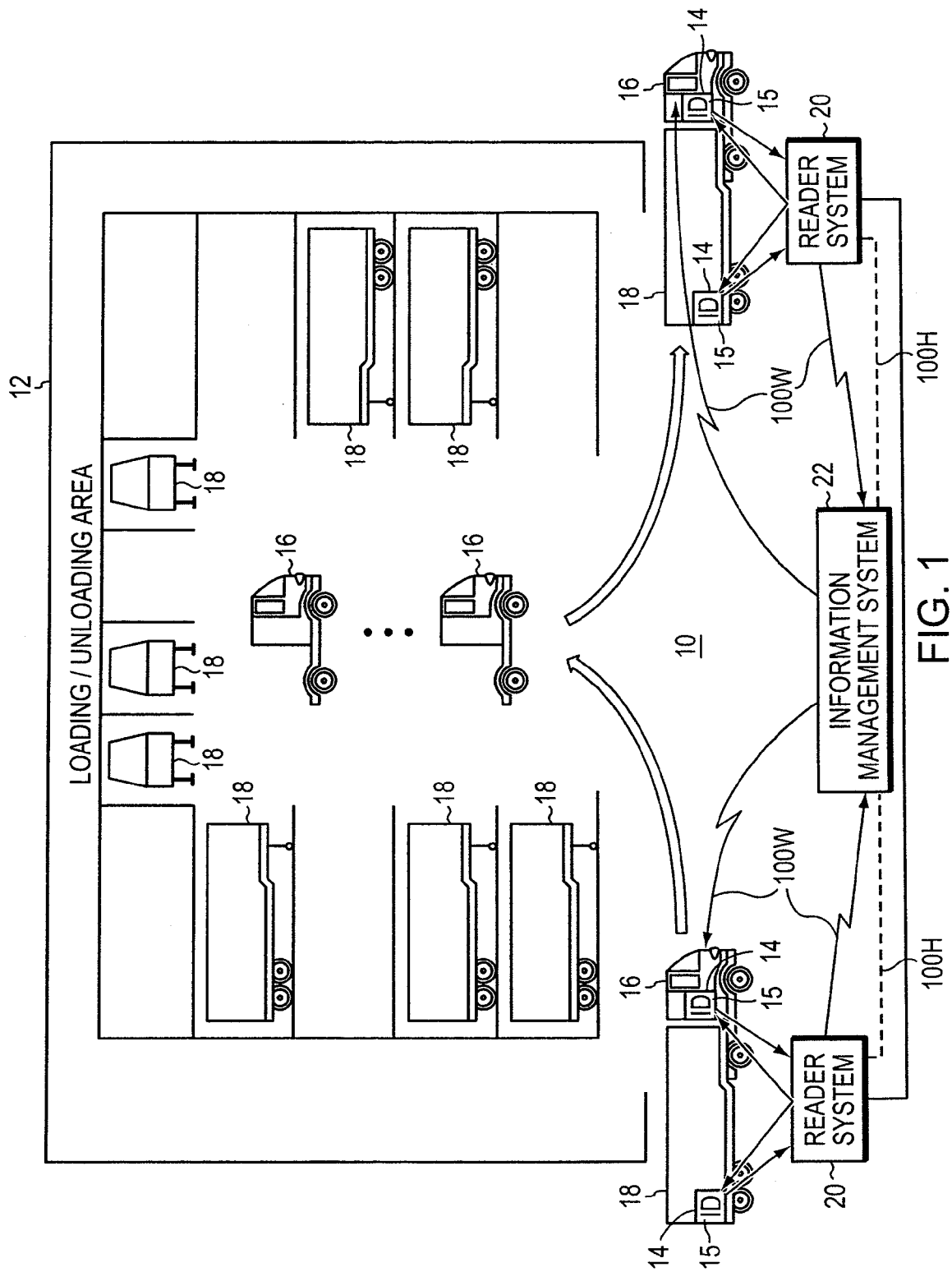
FIG. 1 illustrates an inventory and dispatch system in accordance with an embodiment of the present invention.

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

A. Radio Frequency Identification Technology

A technology known as radio frequency identification technology (RFID) uses radio waves rather than optics to capture and transmit data. RFID is basically a form of labeling where electronic labels or tags are programmed with unique information and attached to objects to be identified or tracked. In RFID electronic chips are used to store data that can be broadcast via radio waves to a reader, eliminating the need for a direct line of sight and making it possible for tags to be placed in a variety of places on or in an object, such as a vehicle. Additional benefits of RFID are the greater data storage capacity of the RFID tag in comparison to the barcode and the decreased likelihood that the RFID tag will be destroyed or otherwise made unreadable.

A typical RFID system consists of a reader, a tag and a data processing system to process the data read from the tag. The tag also is called a transponder, an expression which is derived from TRANSmitter/resPONDER and, in some cases, the term tag is used for low-frequency (e.g. 125 kHz), whereas the term transponder is used for high-frequency (e.g. 13.56 MHz and 2.45 GHz) tags. But for purposes of this application the terms tag and transponder are used interchangeably. The complexity of the reader (sometimes referred to herein as an interrogator) can vary considerably, depending on the type of tag used and the function to be fulfilled. In general, a reader has radio circuitry to communicate with a tag, a microprocessor to check and decode the data and implement a protocol, a memory to store data and one or more antennas to receive the signal.

Unlike a barcode reader, which is limited to reading a single barcode at a time, a RFID reader may have more than one tag in its interrogation zone. The interrogation zone, as that term is used herein, refers to the area covered by the magnetic field generated by the reader's antenna. The process of reading a number of transponders within a system's interrogation zone is known as batch reading. Software applications known as anti-collision algorithms exist that permit a reader to avoid data collision from several tags that enter the interrogation zone at the same time. One of three different anti-collision techniques is generally implemented; these techniques are spatial, frequency and time domain procedures.

In the spatial domain technique, the reader restricts its interrogation zone in order to reduce the possibility that two different transponders fall into the area covered by the reader itself. With this technique, the number of readers needed to cover an area increases in proportion to the size of the covered area. Frequency domain procedures are based on frequency domain multiplex techniques or spread spectrum technologies. In these systems, the reader broadcasts a status of frequencies allocated to the communication with the transponders, with frequencies flagged that are currently in use by a transponder. When a new transponder accesses the reader's coverage, it uses an unoccupied frequency to transmit its data.

Time domain anti-collision techniques are divided into two categories: interrogator and transponder driven procedures. In addition, interrogator driven time domain anti-collision procedures can be sub-divided into polling and binary search procedures. Polling techniques make use of the fact that a unique serial number is written to each transponder at the production stage. In the polling technique, the interrogator requests all possible transponder serial numbers until a transponder with a polled serial number responds. The polling procedure is typically slow and generally is limited to processes employing small numbers of transponders. The other interrogator driven procedure is the binary search. A binary search is faster than the polling technique, and is based on search algorithms that use binary trees of transponder identifiers. In the transponder driven anti-collision procedures, the transponder, rather than the interrogator, controls the data flow. In general, transponder driven procedures are based on the cyclic transmission of identifiers by transponders and are designed such that it is unlikely that any two transponders will send the same identifier at the same time.

B. Using RFID and Other Such Technology at a Staging Area

FIG. 1 illustrates an inventory and dispatch system 10 for use at a staging area 12 in accordance with an embodiment of the present invention. The inventory and dispatch system 10 comprises identification tags 14 that are physically associated with each powered unit 16 and each container device 18 that is entering or exiting the staging area 12. In the particular embodiment shown in FIG. 1, the powered unit 16 is a tractor and the associated container device 18 is a trailer, together which form a tractor-trailer combination of a type that is commonly used to transport goods via roadway. As indicated above, a "powered unit" 16, as used herein, generally refers to any vehicle capable of providing the means to move items or container devices 18 from one location to another within a transportation system, such as a tractor, a locomotive, a tug, a van, a ship, or any other such vehicle, and a "container device" 18, as used herein, generally refers to any container-like structure that can be used to hold goods for transport, such as a trailer typically pulled by a tractor, a shipping or cargo container commonly seen on ships and trains, an air cargo container (sometimes referred to as an "igloo"), or any other such device that can be used to hold goods as they are transported under the control of an associated powered unit.

The system 10 further comprises one or more reader systems 20 for capturing information contained on (or in) each identification tag 14, and an information management system 22 for tracking and coordinating the flow of vehicles and containers moving into, and out of, the staging area 12. Each of these subsystems will be described in detail below. Note that in the embodiment shown in FIG. 1, the staging area 12 is depicted as a type of delivery hub that would typically be used by tractor-trailer delivery trucks. As such, to clearly illustrate the detailed aspects of the present invention, the invention is often described in the context of such a staging area. However, one of ordinary skill in the art will readily recognize that the systems and methods described herein are equally advantageous when applied to other staging areas, including, but not limited to, rail yards, air terminals, and shipping ports, the operation of which typically involves the need for tracking and coordinating the flow of vehicles, containers and other such items. Unless otherwise indicated, the term "vehicle", as used herein, is generally considered to be synonymous with the term "powered unit."

The reader system 20 of FIG. 1 can broadly be described as any system capable of capturing information contained on (or in) the identification tags 14, which are associated with each powered unit 16 (e.g., tractor) or container device 18 (e.g., trailer) entering or leaving the staging area 12. The information contained on each identification tag 14 includes an identifier 15 for uniquely identifying that particular powered unit 16 or container device 18 that it is associated with. In one embodiment, the identification tags 14 can be a type of label which is affixed to a portion of each powered unit 16, or container device 18, and which include the identifier 15 identified in a variety of formats, including having the identifier displayed in the form of human readable indicia, encoded into a bar code, and/or stored on an RFID tag embedded in the label. Preferably, each identification tag 14 includes at least an RFID tag, or other wirelessly accessible device, that can be affixed to a portion of each powered unit 16 or container device 18 from which a reader system 20 can automatically read the unique identifier 15.

For example, in the case of a tractor-trailer combination 16, 18 as shown entering the delivery hub of FIG. 1, a first RFID tag 14 having a first identifier 15 would be physically associated with the tractor 16, and a second RFID tag 14 having a second identifier 15 would be physically associated with the trailer 18. Or, similarly, each cargo container 18 on a train entering a rail yard, or each air container ("igloo") 18 being brought into an air terminal, could include an RFID tag 14 having a unique identifier 15 associated with it, as could the vehicle/powered unit 18 hauling such containers in each such embodiment. Yet other examples can include a combination of the above, such as a tractor-trailer 16, 18 entering a delivery hub 12, in which the trailer 18 contains a plurality of air containers, each such container having its own RFID tag 14, and each such container to be dispatched differently within the delivery hub 12. Preferably, the RFID tags 14 used in connection with the present invention are passive RFID tags operating, for example, in the frequency range of 915 MHz or 13.56 MHz. However, the selection of an RFID tag for a particular application will typically depend upon one or more of the above stated considerations regarding RFID tags and their operation.

In one embodiment, the reader system 20 includes an RFID interrogator capable of reading the identifier 15 stored on an RFID tag 14 that is associated with a vehicle 16 (or container 18) passing within range of the RFID reader's interrogation zone. The reader system 20 also includes a means for communicating the captured identifier 15 to the information management system 22. In one embodiment, the identifier 15 is transmitted from the reader system 20 to the information management system 22 via a wireless link 100W. This can be accomplished in a known manner by configuring the reader system 20 and the information management system 22 to communicate over a Wireless Local Area Network (WLAN) that operates using, for example, the 802.11 standard of wireless communication. The WLAN can also provide one of the ways by which the information management system 22 communicates with the driver of a delivery vehicle 16. In another embodiment, communication between the reader system 20 and the information management system 22 can occur via other wireless means, a standard telephone wire or other "hard" wire link 100H, network cable, or other communicative means.

Figure 2:
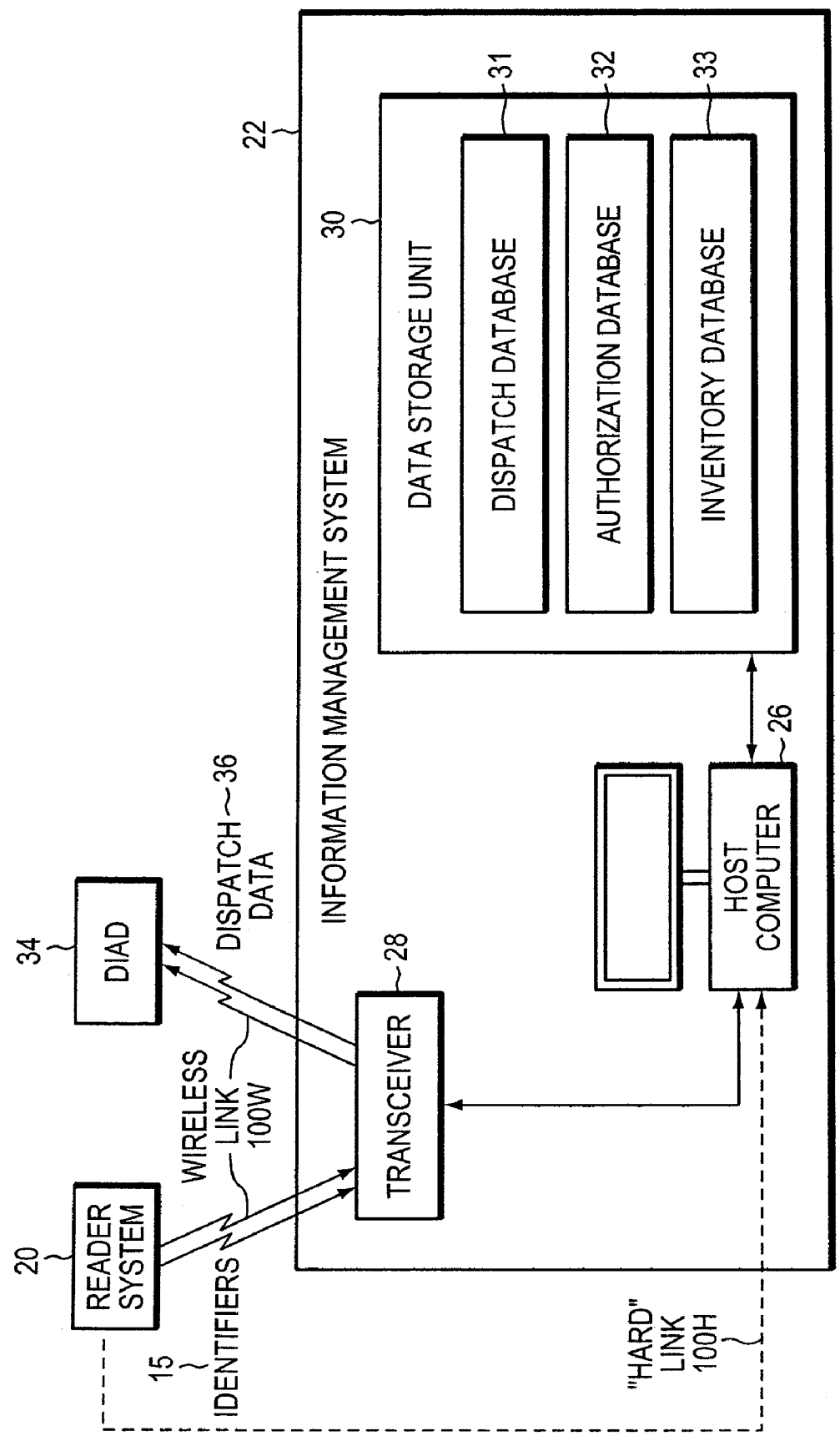
FIG. 2 illustrates an information management system in accordance with an embodiment of the present invention.

FIG. 2 illustrates an information management system 22 in accordance with an embodiment of the present invention. The information management system 22 includes a host computer 26, a transceiver 28, and a data storage unit 30. In general, the host computer 26 is used for coordinating the inventory and dispatch procedures at a staging area 12, such as the one shown in the embodiment of FIG. 1. To enable wireless communication between the host computer 26 and the reader systems 20, as well as other devices such as a DIAD 34 (or another suitable on-board computer terminal 34) used by a delivery driver, the host computer is communicatively connected to the transceiver 28. The reader system 20 can be configured to communicate with the host computer 26 via a "hard" link 100H, and/or a wireless link 100W via the transceiver 28. The transceiver 28 can be any known device capable of sending and receiving wireless transmissions. In one embodiment, the host computer 26 communicates with the reader systems 20 and DIADs (or other on-board computers) 34 via the transceiver 28 over a Wireless Local Area Network (WLAN). To assist in coordinating the operations of the staging area 12, the host computer 26 is programmed to perform queries, based on information received from the reader systems 20, of various databases contained in the data storage unit 30. The data storage unit 30 comprises a dispatch database 31, an authorization database 32, and an inventory database 33. The functionality associated with each of these databases will be described in detail below.

Figure 3:
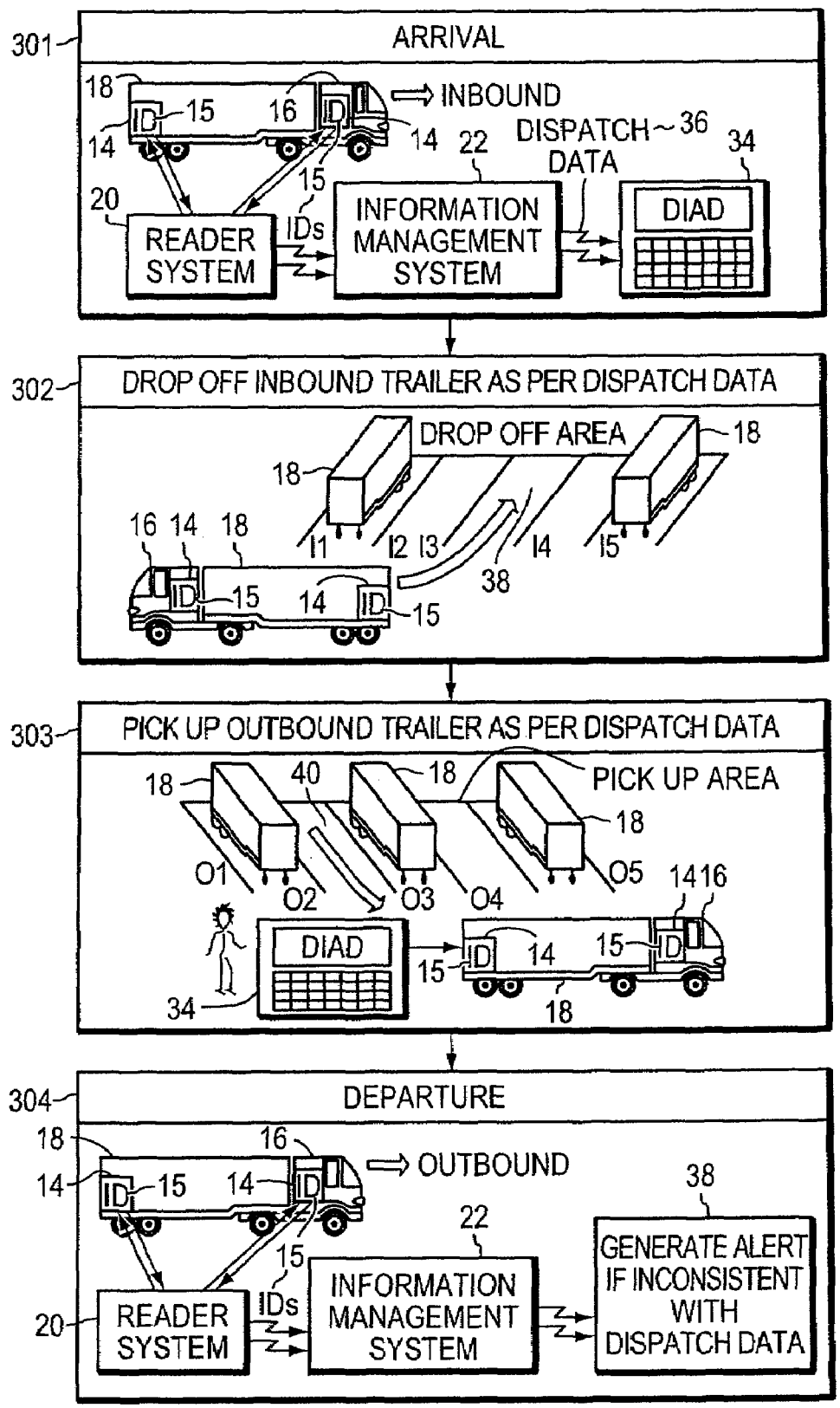
FIG. 3 is a flow diagram that illustrates a sequence of steps for automating inbound and outbound procedures at a staging area in accordance with an embodiment of the present invention.

FIG. 3 is a flow diagram that illustrates a sequence of steps for automating inbound and outbound procedures at a staging area 12 in accordance with an embodiment of the present invention. In the embodiment depicted, at block 301, an inbound tractor 16 pulling a trailer 18 arrives at a delivery hub 12. To uniquely identify each inbound tractor 16 and each inbound trailer 18, an identification tag 14 is separately associated with each such item. According to one embodiment, the identification tags 14 associated with an inbound tractor-trailer delivery truck include a first RFID tag 14 that is physically associated with the inbound tractor 16, and a second RFID tag 14 that is physically associated with the inbound trailer 18. The first RFID tag 14 includes a first identifier 15 for uniquely identifying the particular inbound tractor 16, and the second RFID tag contains a second identifier 15 for uniquely identifying the particular inbound trailer 18. According to this embodiment, the reader system 20 correspondingly includes an RFID reader positioned near the entrance of the hub 12 so as to ensure that the first and second RFID tags 14 pass within the reader's interrogation zone as the tractor 16 and accompanying trailer 18 drive through the inbound gate. This allows the reader system 20 to automatically detect the arrival of all inbound delivery trucks.

In one embodiment, to coordinate the events associated with the arrival of an inbound delivery truck (or other such delivery vehicle/container device(s) combination), the reader system 20 automatically transmits the first and second identifiers 15 to the information management system 22. Using the first and second identifiers 15 received from the reader system 20, the information management system 22 queries the dispatch database 31 to retrieve dispatch information 36 that is associated with the inbound tractor 16 and accompanying trailer 18. The dispatch information 36 returned in the query may include, for example: data indicating a defined location where the inbound trailer needs to be dropped off; data identifying an outbound trailer, which the driver is assigned to transport subsequent to dropping off the inbound trailer; data indicating a defined location where the outbound trailer is located; and, data indicating where the driver of the inbound tractor needs to transport the new, outbound trailer after leaving the hub 12.

In another embodiment, the delivery vehicle 16, 18 could be a train entering a rail yard 12, which includes a locomotive 16 and a plurality of containers 18 (each with its own RFID tag 14), and the dispatch information 36 could include data indicating which containers to unload from the train, where to place such unloaded containers, which containers to load onto the train, where such containers to be loaded can be found, etc. The circumstances of other staging areas 12 (e.g., an air terminal) may require that yet other data be included in the dispatch information 36.

Under one embodiment of the invention, by use of the information management system 22, the system has preferably predetermined what the driver's dispatch is, because the information management system 22 knows the driver is coming in. The driver's dispatch, once complete, will sit in an 802 message cue; as soon as the trigger event happens when the RFID tags are read, the information management system 22 transfers the driver's dispatch to the driver (wirelessly through, for example, 802 protocol).

The information being sent through link 100W in FIG. 2, from the information management system 22 to the driver's terminal 34, can include information such as a greeting to the driver, as well as information regarding where the driver should drop off the trailer 18, and also information regarding where the driver should pick up the next trailer, if applicable. Alternately, the driver could be instructed to park the tractor 16, unattached to the trailer, at a designated parking location. The driver could also be told to switch tractors. When the driver is done with the delivery side of the dispatch, the driver looks at the dispatch instructions to determine if, when, and where to go to get another trailer that is in another bay and is to take that trailer out of the hub to a remote location.

The information being sent through link 100W in FIG. 2, from the information management system 22 to the driver's terminal 34, can also include query-type information which will allow the driver to provide some feedback regarding the condition of the vehicle. This will facilitate improved maintenance of the tractor and the overall fleet. In one embodiment, this is done by querying the driver through the driver's terminal (e.g. "Do you have anything to report regarding machinery malfunction or other concerns?). This encourages DOT compliance.

Furthermore, the information being sent through link 100W in FIG. 2, from the information management system 22 to the driver's terminal 34, can also include information which will facilitate a subsequent communication from the driver's terminal 34 to a device on the trailer. For example, in one embodiment, the "identification tag" 14 on the trailer 18 could be a wireless chip set of a device contained on or in the trailer, such as a wireless locking device, and the identifier 15 used for identifying the trailer 18 could be such device's media access control (MAC) address. As is known by those of ordinary skill in the art, a MAC address is typically associated with each wireless device. The link between the driver's terminal 34 and the device (such as a wireless locking device) on the trailer may be, in one embodiment, provided by a Bluetooth (or other suitable wireless) protocol link that is first verified and then provides data transmission along a wireless link. Alternatively, however, communication between the driver's terminal 34 and such device (with identifier or MAC address 15) on the trailer could occur using a "hard-wire" type system such as using PLC technology (Power Line Carrier), which uses the tractor and trailer power lines.

Continuing with the embodiment of FIG. 3, to carry out the instructions contained in the dispatch data 36, the information management system 22 communicates the dispatch data to the driver of the inbound tractor 16. Preferably, the dispatch data 36 is transmitted wirelessly from the information management system 22 via the transceiver 28 to a type of computer device 34, which is operable to receive such information and convey it to the driver of the tractor 16. For example, such data could be transmitted via wireless links 100W as shown in FIGS. 1-2. Referring now back to FIG. 3, the computer device 34 can be an on-board computer mounted in the cab of the tractor 16, a portable data acquisition device such as a DIAD, a cellular telephone capable of receiving text or voice messages, or any other such device capable of receiving the dispatch data 36 and conveying it to the driver of the inbound tractor (or other such delivery vehicle). In one embodiment, the wireless transmission between the information management system 22 and the computer device 34 occurs over a wireless local area network (WLAN) using, for example, the 802.11 standard for wireless communication.

At block 302, the driver of the tractor begins to carry out the instructions contained in the dispatch data 36, which the driver received via the wireless transmission from the information management system 22. Typically, after entering the hub 12, the driver of the tractor 16 parks the inbound trailer 18 in a pre-assigned drop-off location, which was communicated to the driver in the dispatch data 36. The pre-assigned drop-off location identified in the dispatch data 36 can be, for example, a particular bin number 38 located within a "drop off" area of the delivery hub 12. After parking the inbound trailer 18 in the appropriate bin location 38, and decoupling the trailer from the tractor 16, the driver can proceed with any additional instructions included in the dispatch data 36.

Proceeding to block 303, the driver of the tractor 16 may be instructed to locate a particular outbound trailer 18, which he or she has been assigned to transport to yet another location. To assist the driver in locating the correct outbound trailer 18, the dispatch data 36 can include an identifier 15 that is contained on (or in) an identification tag 14, which is associated with the outbound trailer. In one embodiment, the identification tag 14 is a type of label which can be affixed to a portion of the trailer 18, and which includes the vehicle identifier 15 identified in a variety of formats, including having the identifier displayed in the form of human readable indicia, encoded into a bar code, and/or stored on an RFID tag embedded in the label. The dispatch data 36 may further include location data for indicating the physical location of the outbound trailer 18 within the delivery hub 12. For example, the location data could include a particular bin number 40 within a "pickup" area of the delivery hub 12.

From an efficiency and cost standpoint, it is important that the driver of the tractor 16 locate, and begin transporting, the correct outbound trailer 18 on the first attempt. Therefore, to ensure that the correct outbound trailer has been located, the driver is expected to perform one or more checks. A first check may include, for example, scanning a bar code that is found on a portion of the trailer's identification tag 14. This could be done to determine whether the identifier 15 on the trailer 18 matches the identifier communicated to the driver in the dispatch data 36. The scanning of the bar code label could be accomplished using the driver's DIAD 34, for example. Alternatively, or additionally, the driver of the tractor 16 may compare the identifier 15 in the dispatch data 36 to a human readable version of the identifier, which is displayed on another portion of the trailer's identification tag 14. When the driver is convinced that he has located the correct outbound trailer 18, the trailer can be connected to the tractor 16 and transported to the destination identified in the dispatch data 36.

At block 304, the inventory and dispatch system 10 performs an additional check to ensure that the driver of the tractor 16 is leaving the hub 12 with the correct outbound trailer(s) 18. As with the inbound case described above, a first identifier 15 associated with the tractor 16, and a second identifier 15 associated with the trailer 18 help to uniquely identify each item. In one embodiment, the first and second identifiers 15 are included on first and second RFID tags 14 physically associated with the tractor 16 and the trailer 18, respectively. In such an embodiment, the reader system 20 correspondingly includes an RFID interrogator positioned to be able to read the first and second identifiers 15 as the tractor 16 and accompanying trailer 18 pass through an outbound gate of the delivery hub 12. In other embodiments, the reader system 20 could similarly be used to read an identifier situated on each vehicle and/or container device exiting a rail yard, air terminal, shipping port, etc., as described above. In yet another embodiment, a device associated with each trailer or container device 18, such as a wireless locking device, can be configured to communicate the trailer identification number 15 to the on-board computer 34 located in the tractor 16. Such communication can occur via a wireless transmission or by some other means, such as by using the tractor and trailer power lines (e.g., PLC—Power Line Carrier—technology). Tractor and trailer identifiers 15 can then be transmitted wirelessly from the on-board computer 34 to the information management system 22 during a time that the tractor and one or more trailers (or other powered units and associated container devices) are leaving the staging area 12.

When the first and second RFID tags 14 of the tractor 16 and the outbound trailer 18 fall within the interrogation zone of the reader system 20, the reader system captures the first and second identifiers 15 and transmits them to the information management system 22. Using the first and second identifiers 15, the information management system 22 queries a dispatch database 31 to retrieve dispatch data 36 related to the tractor 16 and accompanying outbound trailer 18. If it is determined from the query of the dispatch database 31 that the first and second identifiers 15 correspond to an unauthorized tractor-trailer pairing, then an appropriate alert or notification 38 can be generated. In one embodiment, the driver of the tractor 16 can be contacted via a wireless communication, and instructed to return to the delivery hub 12 with the incorrectly pulled trailer 18. The notification 38 to return the incorrectly pulled trailer 18 to the hub 12 can include a message generated and transmitted automatically by the information management system 22, to an onboard computer device 34 in the cab of the tractor 16. Alternatively, the notification 38 can include a wireless telephone call made to the driver of the tractor 16 by a dispatch attendant who received a corresponding alert from the information management system 22.

In yet another embodiment, as soon as the driver of a tractor 16 hooks up to a trailer 18, a device associated with such trailer (such as a wireless locking device) can be configured to communicate the trailer identification number 15 (or some other such identifier) to the on-board computer 34 located in the tractor. If the on-board computer 34 determines that the trailer number/identifier 15 is incorrect, based on the dispatch data received from the information management system 22, the computer 34 can send an alert to the driver and/or personnel in the information management system to prevent the driver from leaving the loading area with the incorrect trailer. In some embodiments, this can serve as the first of several checks to prevent trailers (and other such container devices and/or powered units) from incorrectly leaving the staging area 12. In the context of other staging areas 12, similar steps could be taken to detect and remedy a situation in which one or more container devices were improperly loaded (or being loaded) onto an outbound train, airplane, or ship, for example.

Figure 4:
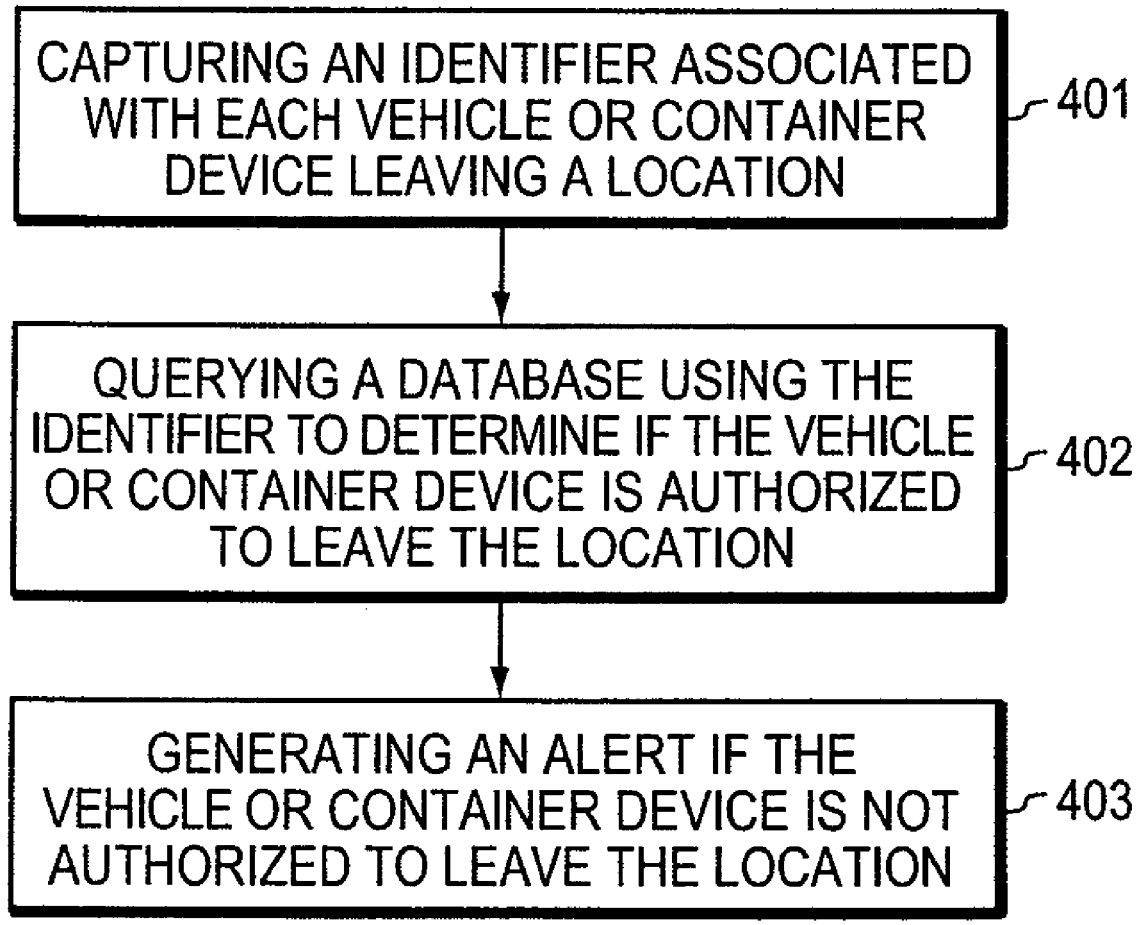
FIG. 4 is a flow diagram that illustrates a sequence of steps for detecting whether a vehicle, container or other such item is leaving a location without authorization, in accordance with an embodiment of the current invention.

FIG. 4 is a flow diagram that illustrates a method of detecting whether a vehicle, a container device, or other such item is leaving a location 12 without authorization in accordance with an embodiment of the present invention. In step 401, an identifier 15 associated with each vehicle (or container device) leaving the location 12 is captured by a reader system 20. The reader system 20 operates in a manner as described above. For example, in one embodiment, the identifier 15 can be stored on an RFID tag 14 that is physically associated with each outbound vehicle 16 (or container device 18). In such an embodiment, the reader system 20 includes an RFID reader, which captures each identifier 15 when the corresponding identification tag 14 is brought within the reader's interrogation zone. The reader system 20 can also be configured to communicate each identifier 15 to an information management system 22, which is responsible for monitoring the flow of vehicles (and/or container devices) into and out of the location 12.

In step 402, an authorization database 32 is queried using the captured identifier 15 to determine whether each corresponding vehicle (or container device) is authorized to leave the location 12. In one embodiment, the query is performed automatically by the information management system 22, which is programmed to check the authorization status of all vehicles and/or container devices that are detected leaving the location 12. In step 403, an alert can be generated whenever a query of the authorization database 32 determines that the corresponding vehicle (or container device) is not authorized to leave the location 12. This method can be used, for example, to detect the occurrence of when a delivery driver is attempting to leave a hub 12 after having mistakenly pulled the wrong trailer 18. The method can also be used as part of a security system to detect whether a vehicle (or container device) is being stolen from a location 12. In the latter situation, the alert generated in step 403 could be an alarm that is used to notify the authorities that a vehicle is in the process of being stolen from the location 12.

Figure 5:
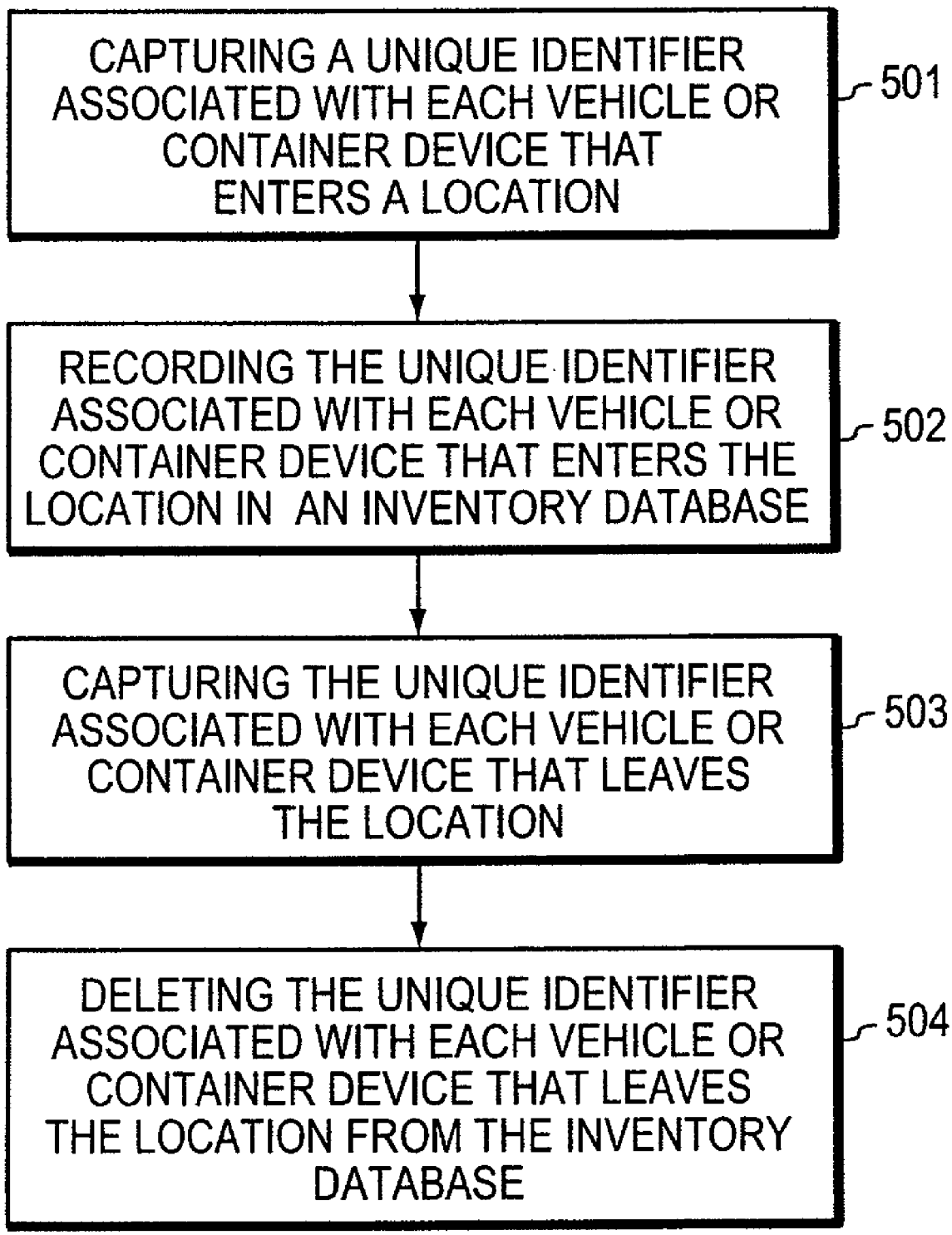
FIG. 5 is a flow diagram that illustrates a sequence of steps for automatically maintaining a real-time inventory of vehicles, containers and other such items at a location, in accordance with an embodiment of the current invention.

FIG. 5 is a flow diagram that illustrates a method of maintaining a real-time inventory of vehicles, container devices and other such items at a location 12 in accordance with an embodiment of the present invention. In step 501, a reader system 20 captures a unique identifier 15 associated with each vehicle, container device, or other such item that enters the location 12. In one embodiment, the unique identifier 15 is stored on an RFID tag 14, which is physically associated with each vehicle (or container device) that enters the location 12. In such an embodiment, the reader system 20 includes an RFID reader, which captures the identifier 15 stored on each corresponding identification tag 14 that is brought within the reader's interrogation zone. The reader system 20 can further be configured to communicate the identifiers 15 to an information management system 22, which is responsible for monitoring the flow of vehicles (and/or container devices) into, and out of, the location 12.

In step 502, the unique identifier 15 that is associated with each vehicle or container device entering the location 12 is recorded in an inventory database 33. The inventory database 33 is part of the information management system 22 (See FIG. 2). In step 503, a reader system 20, similar to the one described in step 501, captures the unique identifier 15 associated with each vehicle (or container device) leaving the location 12. As with the inbound situation described in step 501, the identifiers 15 corresponding to outbound vehicles and/or container devices can be communicated from the reader system 20 to the information management system 22. In step 504, the unique identifier 15 associated with each such item leaving the location 12 is deleted from the inventory database 33. In this way, the method of FIG. 5 provides a real-time inventory of all such items that are on-site at a given location 12 at any particular time. In one embodiment, the information management system can be further configured to transmit inventory data via a network to a central computer system or database. The central computer system can be used as a repository for holding inventory data related to a plurality of staging areas or other such locations. This would allow a dispersed organization, which includes a plurality of such staging areas, to maintain a real-time vehicle (or container device) inventory system for the entire organization.

Figure 6:
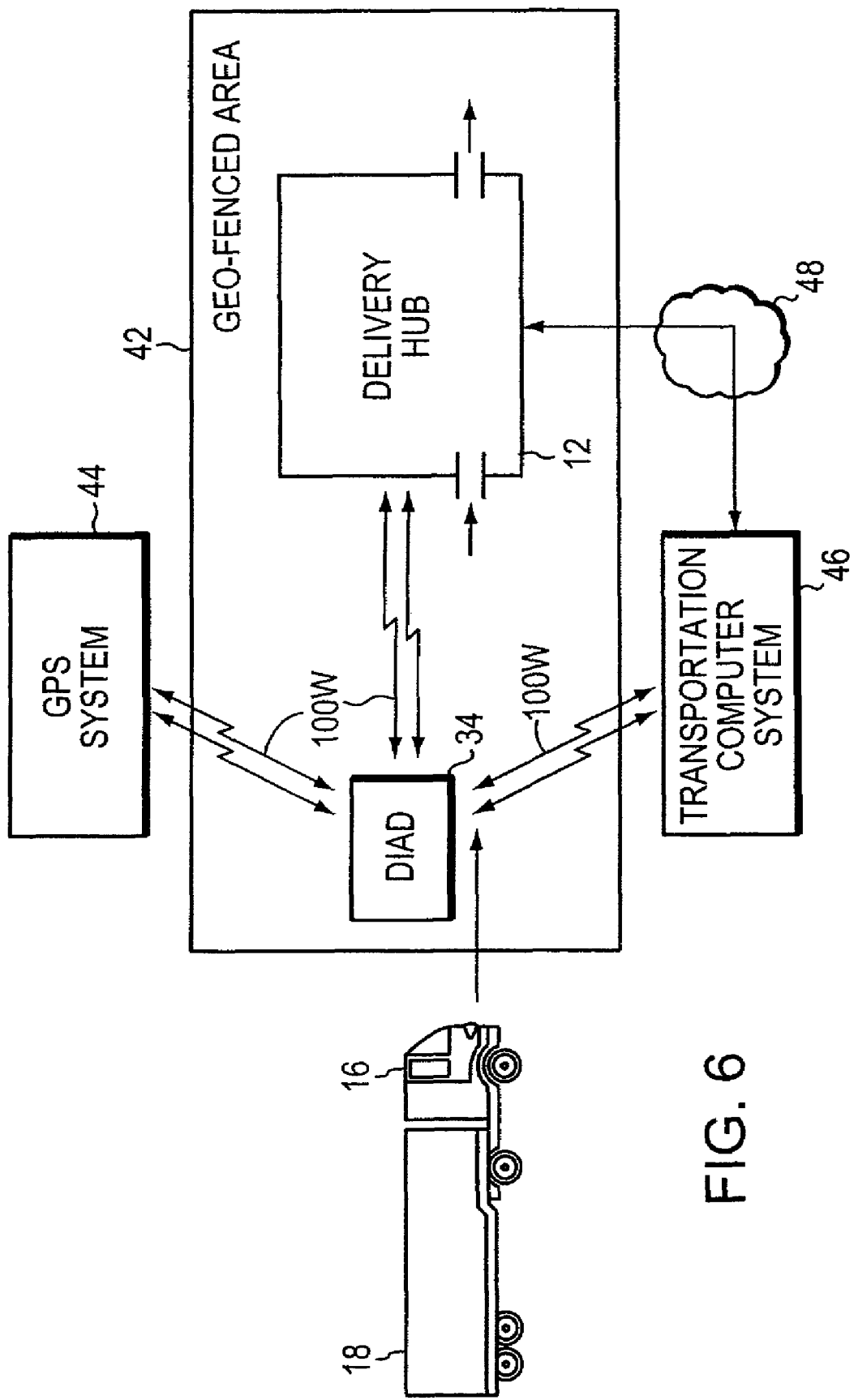
FIG. 6 illustrates an inventory and dispatch system that includes a "geo-fencing feature" in accordance with an embodiment of the present invention.

FIG. 6 illustrates an inventory and dispatch system that includes a "geo-fencing feature" in accordance with an embodiment of the present invention. It should be understood that the present invention could be used in conjunction with a "geo-fencing feature," facilitated by the use of GPS technology in the operator's on-board computer device 34. A predetermined "zone" 42 is provided using GPS coordinates. When the DIAD 34 enters the zone 42, it recognizes it is within the zone by monitoring data received from a GPS system 44, as the DIAD has been pre-populated with information regarding the geo-fenced area. This occurrence can be used as a "trigger," which can advise the computer systems of the hub location 12, or computer systems 46 at other locations, that the operator is within a certain distance relative to the hub. The computer system 46 could be, for example, a central computer system that is operable to communicate with computer systems at the hub 12 via a network 48. In one embodiment, the geo-fence is positioned outside the peripheral area of the hub 12 (for example; five to ten miles outside).

Upon entering the geo-fenced area 42, the GPS component will recognize it is within the geo-fenced area by monitoring data received from the GPS system 44, and a signal can be sent from the DIAD unit 34 (via wireless communications such as cellular telephone), advising that the driver was at a certain GPS location at a certain time. This can allow the overall system to advise the hub 12 that the operator is approaching the hub, and the approximate time it will take the operator to arrive at the hub. This can be useful for the hub operators in that it can give them advance notice of when the driver will arrive. This can be especially helpful if the driver may be late; this may allow the hub operators to re-allocate their resources to accommodate the late-arriving driver. By knowing the type of loads coming in, and the volume of such loads, at any given time, the staging area 12 can better plan the flow and/or start times for sorters, for example.

Another feature which may be facilitated by the use of geo-fencing, is that the driver, by return communication from the contacted system 12, 46, would be pre-informed of the drop off position of his trailer 18. In one embodiment, this could be the only notification the driver would have of where to dispatch his trailer 18 (for example, dispatch your trailer in Bay 3). In an alternate embodiment, the RFID recognition described elsewhere in this application could be used to confirm that the driver, in fact, will be dropping his trailer 18 at, for example, Bay 3.

Figure 7:
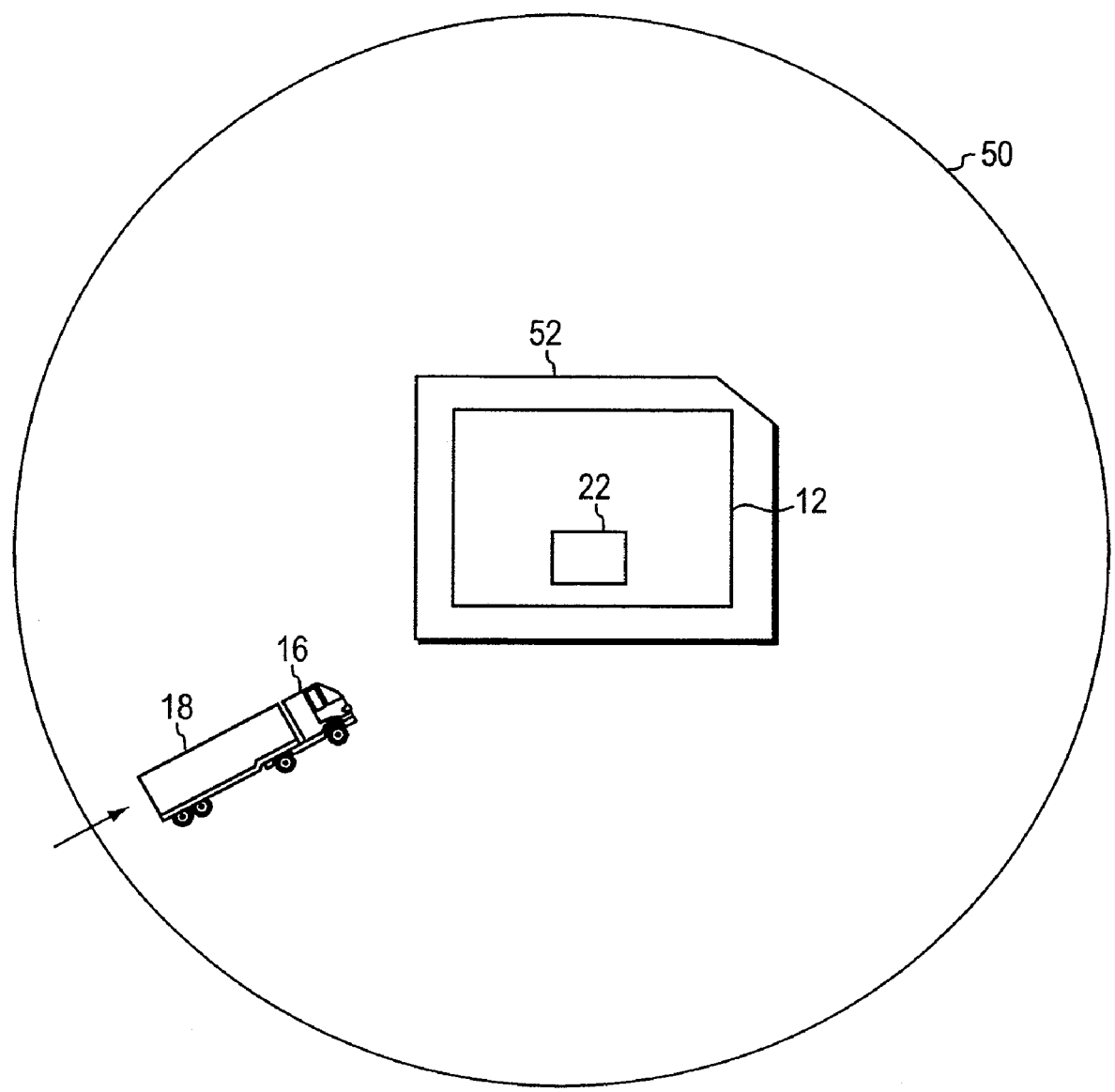
FIG. 7 illustrates an inventory and dispatch system that includes a "geo-fencing feature" in accordance with another embodiment of the present invention.

FIG. 7 illustrates an inventory and dispatch system that includes a "geo-fencing feature" in accordance with another embodiment of the present invention. Under one embodiment of the invention, a plurality (in this case two) of predetermined "geofences" 50 and 52 are set up in the operator's on-board driver's terminal 34, using GPS coordinates. Generally described, the establishment of these geofences allows for an event to be initiated by the operator's on-board driver's terminal 34 when it crosses one of the fences, or it can be subject to different business rules depending on whether or not the on-board driver's terminal 34 is inside or outside a particular fence.

In the example embodiment shown in FIG. 7, as noted above, two geofences 50 and 52 are set up. This set up can be relatively static, or can be changed as needed.

Under the embodiment shown, the outer geofence 50 is circular and approximately 10 miles in radius from a selected point proximate the staging area 12, in one case proximate the primary unloading area where unloading of the trailers is provided.

The inner geofence 52 can be set up to enclose an area approximately 1000 feet in radius from a selected point proximate the staging area 12, in one case proximate the primary unloading area where unloading of the trailers is provided. This distance is of course only exemplary and could be varied as needed. It may be seen that this geofence is not circular, but has been configured to approximate the property line of the staging 12. This allows the GPS unit of the terminal 34 to determine if the unit is "on" or "off" the property. A simple circle could be used if logistically appropriate.

It should therefore be understood that it is not critical that the geofences be circular, they can take a variety of shapes (square, rectangular, irregular, etc.,) to adapt to the needs of the particular situation.

An example will now be made of a tractor-trailer combination in an "incoming" mode, approaching the staging area 12. As the tractor-trailer combination 16, 18, crosses the outer geofence 50, the driver's terminal (e.g. a DIAD) 34 also enters the zone 50 (by being in the cab of the tractor). The driver's terminal 34 recognizes it is within the zone by monitoring data received from a GPS system included in the operator's on-board driver's terminal 34, as the driver's terminal 34 has been pre-populated with information regarding the geo-fenced area. It may also be understood that the terminal can determine the heading (direction) of the driver's terminal 34, a confirmation can be made that the tractor is "entering" the area.

Upon crossing the outer geofence 50, the driver's terminal 34 initiates wireless contact with the information management system 22, said wireless contact taking many possible varieties, but including an SMS short message service transmission via a cellular connection, a cellular telephone call, or another suitable wireless connection. This contact allows the driver's terminal 34 to collect and transmit information such as location, speed, and direction (via the GPS data) to the information management system 22. The information management system 22 can also confirm the identity of the driver's terminal 34 by checking its IP, MAC, or other suitable address as the case may be. This allows the information management system to prepare an 802 message cue (under this embodiment, other wireless protocols may also be used) to be ready to be transmitted to the driver's terminal 34. This message cue can include information needed by the driver to unload the trailer, such as which bay or parking space in which to park the trailer, whether to disconnect from the trailer or not, etc. This message cue (which will be stored on the driver's terminal 34 for review by the driver) can also include other instructions or queries to the driver such as whether the tractor or trailer has maintenance needs, etc. Finally, the message cue can include departure instructions, such as which trailer to pick up from which location at which time, and the destination intended for the trailer.

The message cue can be sent to the driver's terminal 34 as soon as the message cue is complete, which could require cellular use, or could wait until a second trigger event occurs.

The embodiment being currently explained in conjunction with FIG. 7 will use such a second event, and it will be the crossing of the inner geofence 52, which in one embodiment is 1000 feet in radius from a selected point proximate the staging area 12, in one case proximate the primary unloading area where unloading of the trailers is provided. This distance is of course only exemplary and could be varied as needed. Furthermore, in one embodiment of the invention this geofence is set to approximate the property boundaries of the staging area, so the driver's terminal 34 will know when it is on and off the staging area property, and can send an alert to the information management system 22 if certain business rules apply. This can be used to deter theft of driver's terminals 34, and can also be used when the tractor is leaving.

The crossing of the inner geofence 52 causes the driver's terminal 34 to initiate wireless contact with the information management system 22 in the staging area 12. Under the current embodiment, 802 wireless connection is used between the two components 34, 22, and the previously discussed 802 message cue is sent to the driver's terminal 34. Again confirmation of the identity of the driver's terminal 34 can be confirmed by the information management system 22 by a check of the MAC address of the driver's terminal 34.

Yet another technology that can be used in accordance with embodiments of the present invention is wireless fidelity (Wi-Fi) mapping. Generally, as used herein, Wi-Fi mapping refers to techniques that use Wireless Local Area Network (WLAN) technology to determine whether (and where) a given wireless device is within the coverage area of a WLAN. Each such wireless device typically includes a unique media access control (MAC) address, which can be detected by one or more "access points" that monitor for such MAC addresses within the WLAN's coverage area. Furthermore, by using the relative signal strength detected by different access points, such systems can also provide positional information for a given device found to be within the coverage area. Wi-Fi mapping and other such techniques can be particularly useful in areas where GPS connectivity is frequently lost. Such areas can include metropolitan/downtown locations, and areas inside of buildings and tunnels. Therefore, if these types of areas are equipped with an appropriate number of access points, then Wi-Fi mapping and other such techniques can be used instead of, or in addition to, geo-fencing to detect and track any vehicle or container equipped with a wireless device that is brought within that given coverage area.

With regard to the present invention, this technology can be used to monitor whether a delivery vehicle (or container), equipped with such a device having a MAC address, has entered (or exited) a staging area 12. Therefore, since Wi-Fi mapping can be used to detect arrival and departure events of delivery vehicles at a staging area 12 (as was performed by the RFID and geo-fencing systems described above), Wi-Fi mapping techniques can be used to trigger the same types of follow-on events described in the embodiments above. Such Wi-Fi mapping techniques can be used in conjunction with, or as an alternative to, the geo-fencing and RFID systems described above.

In yet another embodiment, the identification tags 14 affixed to the powered units 16 and container devices 18 can be Bluetooth-enabled wireless devices, and the reader system(s) 20 can correspondingly be configured to initiate communication with all such devices that come within range of them. As with the use of RFID tags described above, an identifier 15 can be stored on each Bluetooth-enabled device 14 so as to uniquely identify each powered unit 16 or container device 18 as it enters or leaves a given staging area 12.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for providing advance notice of arrival of a delivery vehicle to a staging area at which the delivery vehicle will be unloaded and/or loaded, said system comprising:
   an information management system for processing data associated with operation of said staging area; and
   a driver's terminal operable to convey information to a driver of the delivery vehicle while the driver is in a position to drive the vehicle;
   wherein said driver's terminal is programmed with a geofence and configured to send a signal to the information management system upon the terminal crossing the geofence to indicate that the delivery vehicle is inbound to the staging area and is within a predetermined proximity to the staging area corresponding to said geofence; and
   wherein said information management system is configured to, pursuant to receiving said signal from the driver's terminal, send to the driver's terminal a driver's dispatch instructing the driver where within the staging area to deliver an incoming load and/or where within the staging area to pickup an outgoing load.

2. The system of claim 1 wherein said information management system is configured to, pursuant to receiving said signal from the driver's terminal, determine an approximate time it will take the delivery vehicle to arrive at the staging area.

3. The system of claim 1 wherein said information management system is configured to, pursuant to receiving said signal from the driver's terminal, determine whether the delivery vehicle is late by considering a time at which the information management system received said signal from the driver's terminal and, if the information management system determines that the vehicle is late, reallocate resources of the staging area to accommodate the late arriving vehicle.

4. The system of claim 1 wherein said information management system is configured to, pursuant to receiving said signal from the driver's terminal, plan flow and/or start times for sorters in the staging area considering a type of the incoming load and a volume of the incoming load being delivered to the staging area and/or considering a type of the outgoing load and a volume of the outgoing load to be loaded onto and taken away by the delivery vehicle.

5. The system of claim 1 wherein said geofence is positioned 5 miles to 10 miles from the staging area.

6. The system of claim 1 wherein said driver's dispatch includes a query and the information management system is configured to receive a response to the query from the driver's terminal.

7. The system of claim 1 further comprising:
a first electronic tag associated with said delivery vehicle; and
a reader configured to read data stored on the first tag.

8. The system of claim 7 wherein said first electronic tag includes an RFID tag and said reader includes an RFID interrogator.

9. The system of claim 8 wherein said driver's terminal comprises a geofencing feature using satellite positioning system data for monitoring whether the driver's terminal enters a predetermined geographic zone corresponding to said geofence.

10. The system of claim 7 further comprising:
a second tag associated with said incoming load or said outgoing load;
wherein said reader is configured to read data stored on the second tag and transfer the data from the first tag and the data from the second tag to the information management system; and
wherein said information management system is configured to determine whether the first tag and the second tag form a proper pair.

11. The system of claim 1 wherein the driver's dispatch includes an intended destination for said outbound load.

12. The system of claim 1 wherein said geofence is an outer geofence and the system further comprises an inner geofence positioned closer to the staging area than the outer geofence.

13. The system of claim 12 wherein said inner geofence is remote from said staging area.

14. A method for providing advance notice of arrival of a delivery vehicle to a staging area at which the delivery vehicle will be unloaded and/or loaded, the method comprising:
providing a driver's terminal for use by a driver of the delivery vehicle;
establishing in the driver's terminal a geofence;
sending a signal from the driver's terminal to an information management system associated with the staging area when the delivery vehicle crosses said geofence for indicating to the information management system that the delivery vehicle is inbound to the staging area and is within a predetermined proximity to said staging area corresponding to said geofence;
pursuant to receiving said signal from the driver's terminal, creating a driver's dispatch including instructions instructing the driver where within the staging area to deliver an incoming load and/or where within the staging area to pickup an outgoing load upon arrival at the staging area and sending said driver's dispatch to said driver's terminal so the driver can proceed in accordance with said instructions upon arrival at said staging area.

15. The method of claim 14 wherein establishing the geofence includes establishing the geofence to be 5 miles to 10 miles from the staging area.

16. The method of claim 14 further comprising, pursuant to receiving said signal from the driver's terminal, determining an approximate time it will take the delivery vehicle to arrive at the staging area.

17. The method of claim 14 further comprising, pursuant to receiving said signal from the driver's terminal, determining whether the delivery vehicle is late by considering a time at which said signal is received and, if the vehicle is determined to be late, reallocating resources of the staging area to accommodate the late arriving vehicle.

18. The method of claim 14 further comprising, pursuant to receiving said signal from the driver's terminal, planning flow and/or start times for sorters in the staging area considering a type and a volume of the incoming load being delivered to the staging area and/or a type and a volume of the outgoing load to be loaded onto and taken by the delivery vehicle.

19. The method of claim 14 wherein creating said driver's dispatch includes creating the dispatch to include a query and sending the driver's dispatch includes sending the query, and the method further comprises receiving a response to said query from the driver's terminal at the information management system.

20. The method of claim 14 wherein providing said driver's terminal includes providing the terminal to include a geofencing feature using satellite positioning system data for monitoring whether the terminal has entered a predetermined geographic zone corresponding to said geofence.

21. The method of claim 14 further comprising:
associating a first electronic tag with said delivery vehicle; and
reading data stored on the first tag.

22. The method of claim 21 wherein providing the first electronic tag includes providing an RFID tag and the step of reading data stored on the first tag includes using an RFID interrogator to read said RFID tag.

23. The method of claim 21 further comprising:
associating a second tag and said incoming or said outgoing load;
reading data stored on the second tag;
transferring the data from the first tag and the data from the second tag to said information management system; and
determining whether the first tag and the second tag form a proper pair.

24. The method of claim 14 wherein creating said driver's dispatch includes creating the dispatch to include an intended destination for said outbound load.

25. The method of claim 14 wherein establishing the geofence includes establishing an outer geofence and the method further comprises establishing an inner geofence positioned closer to the staging area than the outer geofence.

26. The method of claim 25 wherein establishing the inner geofence includes establishing the inner geofence to be remote from said staging area.

* * * * *